United States Patent [19]

Belanger

[11] Patent Number: 4,497,631
[45] Date of Patent: Feb. 5, 1985

[54] WIND-POWERED WATER-CRAFT

[76] Inventor: Ernest Belanger, 243 Leblanc St., Chute-aux-Outardes, Province of Quebec, Canada, G0H 1C0

[21] Appl. No.: 416,944

[22] Filed: Sep. 13, 1982

[51] Int. Cl.³ .............................................. B63H 13/00
[52] U.S. Cl. ............................................. 440/8; 440/6
[58] Field of Search ................. 440/6, 8; 114/39, 123, 114/126, 61; 441/35, 38, 39, 40, 41, 42

[56] References Cited

U.S. PATENT DOCUMENTS

| | | | |
|---|---|---|---|
| 3,134,113 | 5/1964 | Boyington | 114/61 |
| 3,520,267 | 7/1970 | Clark | 114/126 |
| 4,047,833 | 9/1977 | Decker | 440/8 |
| 4,082,049 | 4/1978 | Nicol | 114/39 |
| 4,324,985 | 4/1982 | Oman | 440/8 |
| 4,371,346 | 2/1983 | Vidal | 440/8 |

Primary Examiner—Trygve M. Blix
Assistant Examiner—Jesús D. Sotelo

[57] ABSTRACT

A wind-powered water-craft including a seaworthy base which may either be a conventional dinghy or a specially-designed flat-bottomed hull, similar in shape to a dinghy. A cabin is supported in and over the central longitudinal portion of the base. Astern, the base is provided with an electric motor which is connected to a battery of the rechargeable type. The roof of the cabin is provided with a generator having an axially-connected wind-driven propeller which drives the latter. The generator is connected to the battery. A pair of keels are removably secured to the craft, one on each side.

3 Claims, 9 Drawing Figures

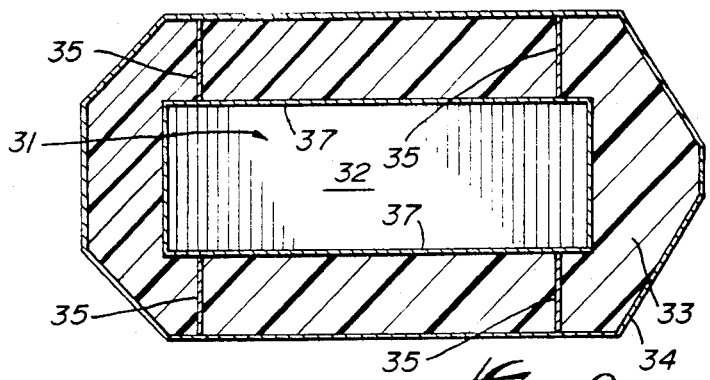
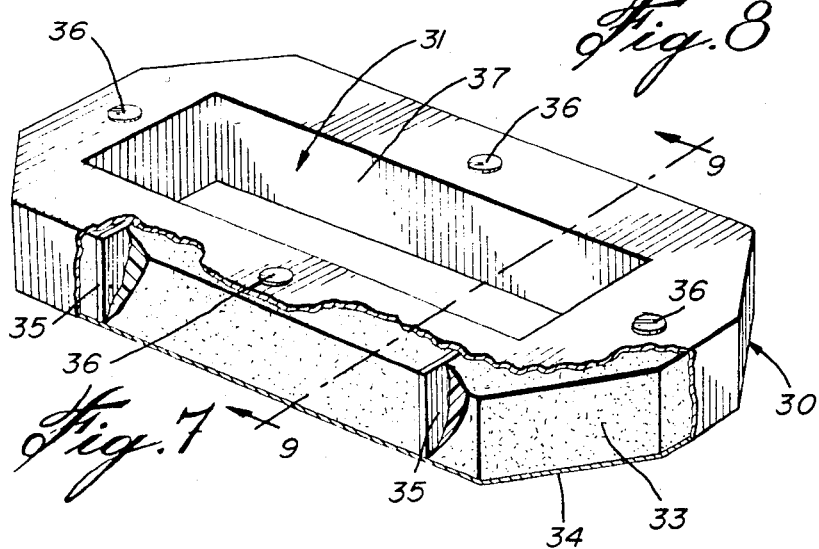
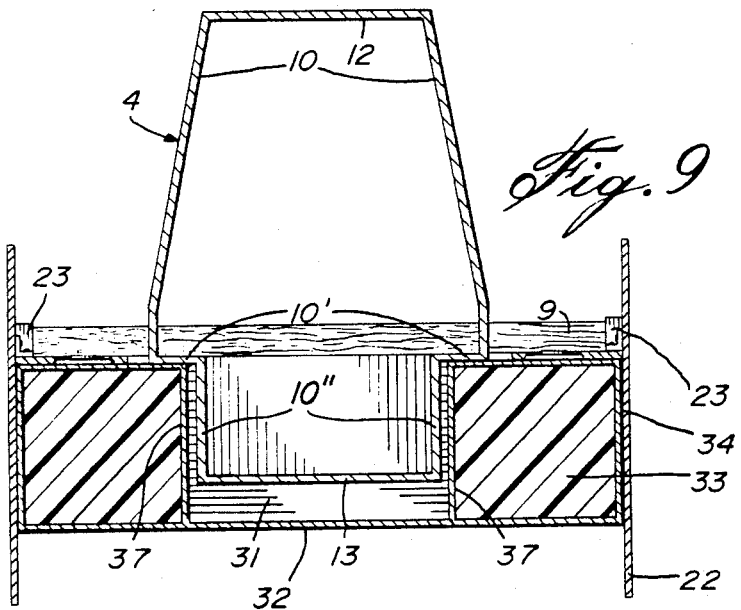

WIND-POWERED WATER-CRAFT

FIELD OF THE INVENTION

The present invention relates to small water-crafts, more specifically to such a craft which obtains its motive power from the wind.

BACKGROUND OF THE INVENTION

Small water-crafts of the type having gasoline-powered inboard and, more prevalently, outboard motors, are very well known and are used for a variety of purposes including pleasure travel and lake, harbour, river and shoreline patrol in the interests of safety on law enforcement, etc. However, such crafts, as is equally well known, can be noisy, are becoming more and more expensive to operate and cause pollution, among other disadvantages.

OBJECTS OF THE INVENTION

Accordingly, it is an important object of this invention to provide a small water-craft of novel construction which is powered by wind.

It is another object of this invention to provide a small water-craft of the above type, which is provided with an electric propelling motor powered by electric batteries, the latter being rechargeable by a wind and/or solar-powered dynamo.

It is yet another object of this invention to provide a water-craft of the above type, which utilizes a conventional air-inflated dinghy as a base in one preferred embodiment.

It is still another object of the invention to provide a water-craft of the above type, which has simplicity of design and is non-costly to produce.

SUMMARY OF THE INVENTION

The above and other objects and advantages of the present invention are realized according to preferred embodiments, each comprising a seaworthy base having a generally rectangular depression in its central portion. In a first embodiment, this base is actually an ordinary air-inflated rubber dinghy. A frame-work is provided, which may take the form of a cabin consisting of a roof, two side walls, a front wall and a rear wall, and adapted to occupy the internal space of the dinghy. Support means are provided to firmly secure the frame-work in the dinghy.

The outer sides of this base are each preferably provided with a vertical keel secured to the frame-work and the lower end of which extends below the bottom surface of this base to prevent lateral drift of the craft. Each keel is preferably provided with a lateral outwardly-projecting stabilizer fin.

The rear end of the base is provided with mounting means for an electric propelling motor, preferably of the outboard type. This motor is powered by electric batteries of the rechargeable type. These latter are electrically connected to a dynamo, or generator, which is in turn powered by a wind-driving propeller mounted on and supported by the frame-work. The propeller is adapted to swivel in any direction according to the direction of the wind. Thus, the batteries are continuously recharged by the propeller, even if the craft is not in motion, as long, of course, as there is wind. In the event that the wind velocity falls below a certain minimal level, a solar panel is also provided, being electrically connected to the batteries. If, on the other hand, the wind velocity is too high, a brake means is provided to stop the rotation of the propeller.

The second preferred embodiment of the invention is identical, in most respects, to the first embodiment described above. However, the base of the second embodiment consists of a flat-bottomed hull, similar in shape to a dinghy and also having a rectangular depression in its central portion.

In both embodiments of the invention, the cabin and wind-powered propeller can be removed and the base can be used as a row-boat and/or can be rigged.

BRIEF DESCRIPTION OF THE DRAWINGS

The above will be more clearly understood by having referral to the preferred embodiments of the invention, illustrated by way of the accompanying drawings, in which:

FIG. 7 is a perspective view, partially broken away, of the base of the second embodiment of the invention;

FIG. 8 is a horizontally cross-sectioned top plan view of the base of FIG. 7; and FIG. 9 is a cross-sectional view, taken along lines 9—9 of FIG. 7, also showing the cabin and the keels in cross-section.

Like numerals indicate like elements throughout the drawings.

DETAILED DESCRIPTION OF THE PREFERRED EMBODIMENTS

Figure 1:
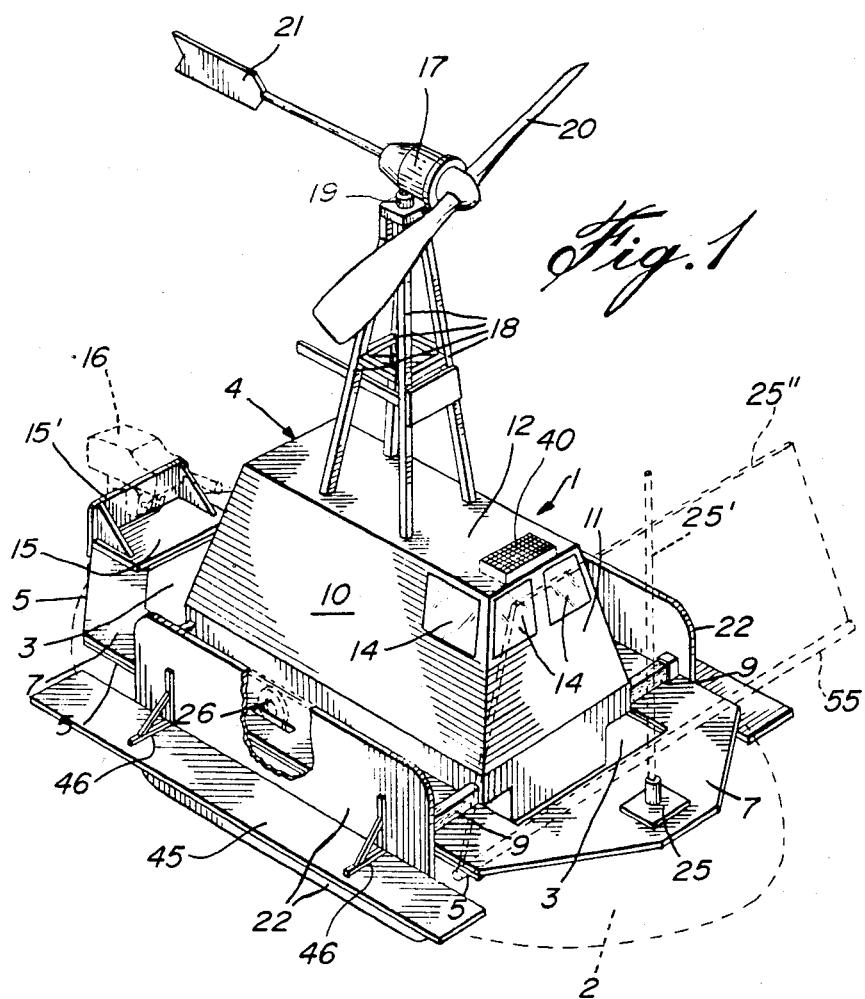
FIG. 1 is a perspective view of the first embodiment of the invention, showing the dinghy in dashed outline.

Referring firstly to FIGS. 1 to 6 inclusively, there is shown a first embodiment of the craft. Craft 1 comprises, in combination, a standard air-inflated dinghy 2 having cross-sectionally circular pontoons formed by side walls 2' to which a floor 2" is attached. The latter is low (as shown clearly in FIG. 4), thereby defining a longitudinal, generally rectangular depression 3.

A cabin 4 is adapted to be securely installed over and in depression 3 by a cabin support means. The latter includes, firstly, two flat, rigid and elongated strips 5 adapted to rest on the top surface 6 of each lateral side of dinghy 2. Secondly, a horizontal flat plate 7 is provided, being adapted to rest laterally on strips 5 and over the entire top peripheral surface of the dinghy. Strips 5 are rigidly secured to plate 7. Plate 7 is formed with a cut-out portion which generally conforms to the inner dimensions or dinghy 2. Thirdly, a pair of fore and aft rigid transverse members 9, made preferably of wood, are provided, each being preferably secured to plate 7 at its opposite ends and resting on the same. Both numbers 9 extend through holes made in the side walls 10 of cabin 4 and support the latter, as seen clearly in FIGS. 1, 2, and 4.

Figure 2:
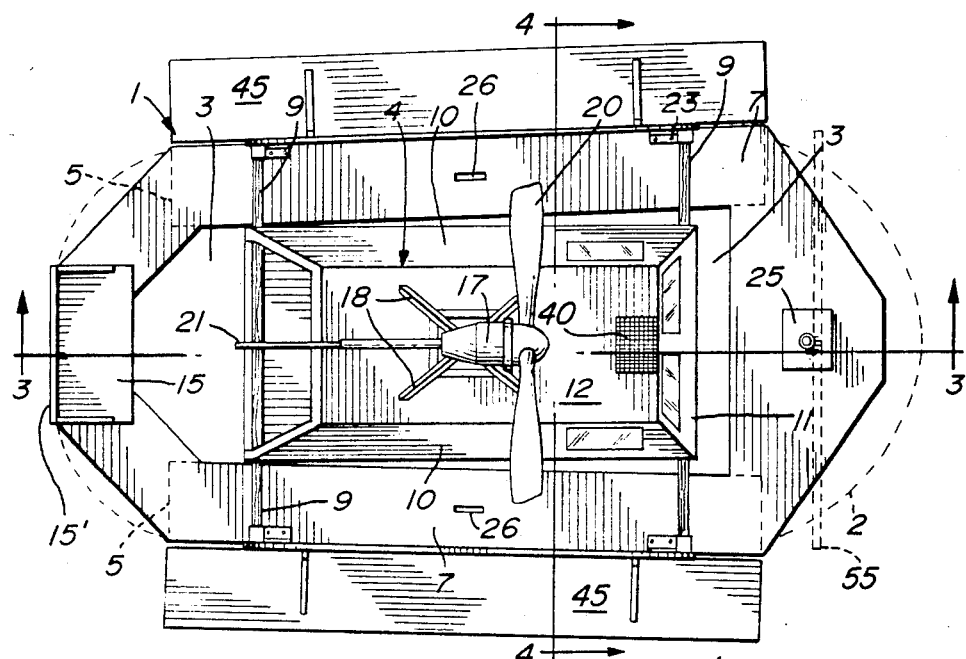
FIG. 2 is a top plan view of the craft shown in FIG. 1.
Figure 3:
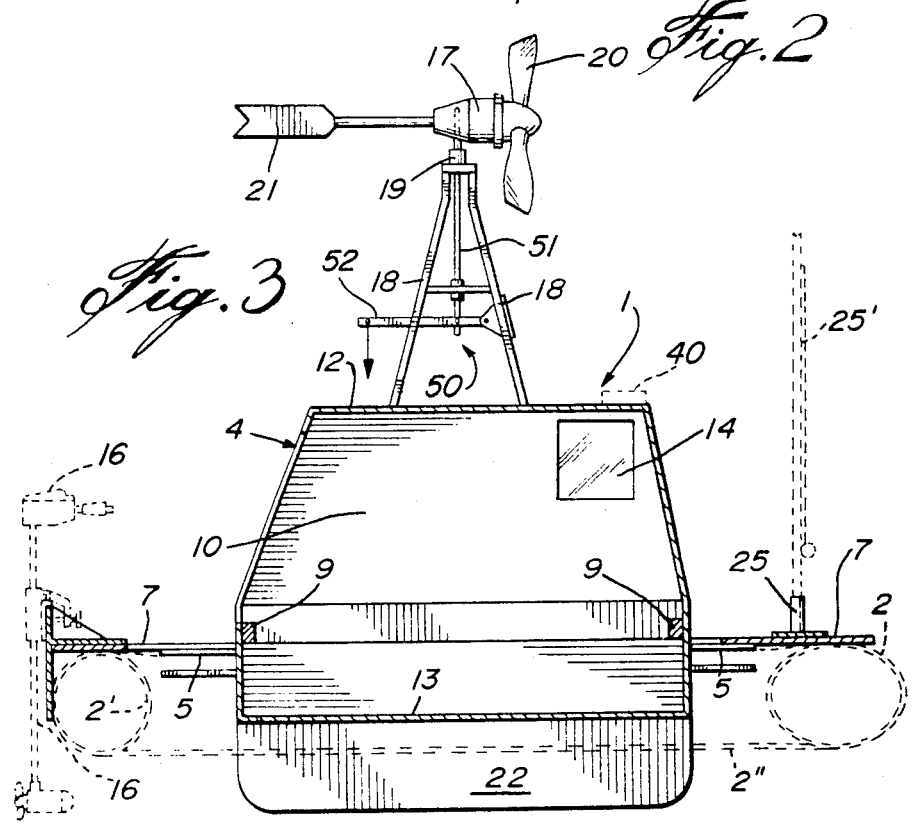
FIG. 3 and FIG. 4 are cross-sectional views taken along lines 3—3 and 4—4 of FIG. 2, respectively.

Cabin 4 is also formed with a front well 11, a roof 12 and a floor 13. The rear end of the cabin can be left open, as depicted in FIG. 2, or, provided with a door, if so desired. Windows 14 are provided in front wall 11 and side walls 10.

Figure 4:
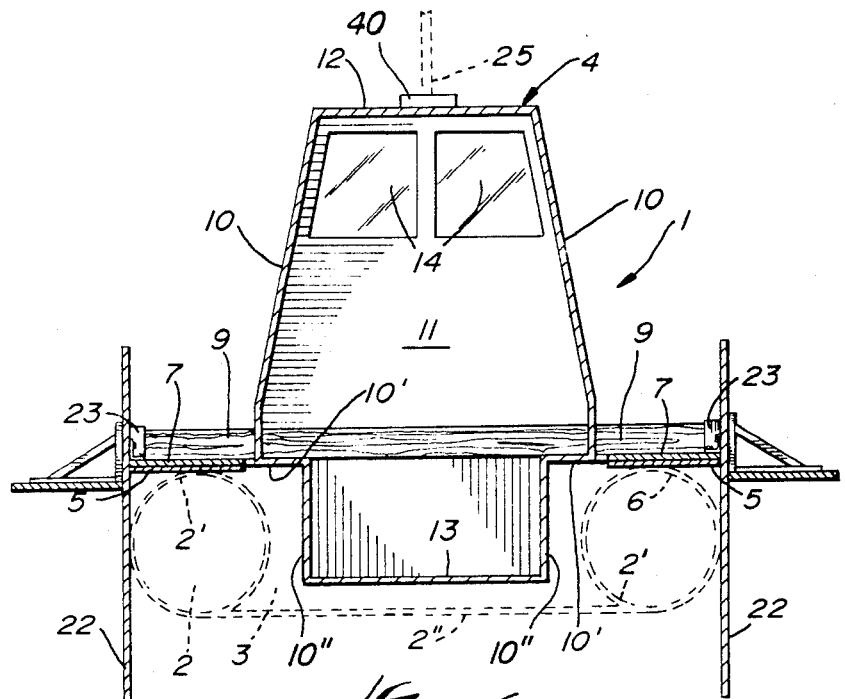
Figure 5:
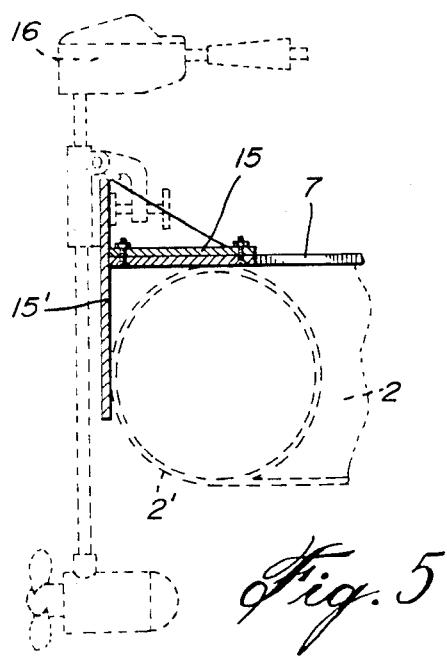
FIG. 5 is an enlarged cross-sectional view of the left side of FIG. 3.
Figure 6:
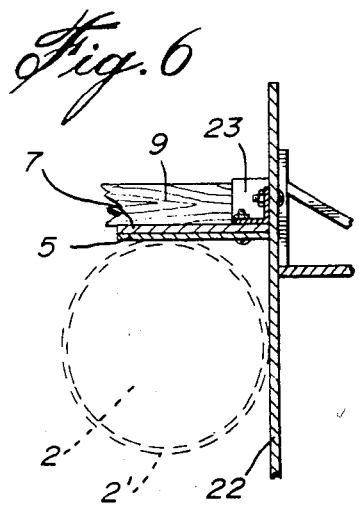
FIG. 6 is another enlarged cross-sectional view of the right side of FIG. 4.

As best seen in FIG. 4, the side walls 10 are each formed with an inwardly-extending shoulder 10', the latter being coplanar with the top surface 6 of dinghy 2. Thus, the lower sections 10" of side walls 10 define a narrower bottom portion of the cabin 4, whereby the latter occupies the space of depression 3. Floor 13 of cabin 4 is spaced slightly above the floor 2" of the dinghy.

The aft portion of plate 7 is provided with seat 15, having a back-rest 15' to which may be secured an electric craft-propelling motor 16 of the outboard type. Back-rest 15' extends downwardly to protect dinghy 2 from motor 16. Motor 16 is electrically connected to one or more batteries (not shown) of the rechargeable type.

The battery or batteries are in turn electrically connected to a generator 17 mounted on roof 12 of cabin 4. The mounting means for generator 17 consists of four splayed legs 18 and a swivel connection 19. A wind-driven propeller 20 is axially connected to generator 17 and revolves in the wind to drive the latter. The rear end of generator 17 is fitted with a rearwardly-extending vane 21, whereby propeller 20 will swing into the direction of the prevailing wind. Thus, the batteries can be continually recharged, even when craft 1 is motionless, provided there is a breeze. If there is no breeze or it is too light—generally less than 7 mph—a solar panel 40 is provided, being located on the roof 12 of cabin 4.

Solar panel 40 consists of a plurality of photoelectric cells electrically connected to the batteries. In order to protect the generator 17 and its propeller 20 from damage if the wind is too strong, a brake 50 is provided, consisting of a depending rod 51 and a handle means 52 which can be operated by an occupant standing at the rear of the craft. The upper end of rod 51 is mechanically connected to a brake shoe (not shown) which brakes the generator of propeller shaft in any suitable known manner.

In order to prevent lateral drift of craft 1, a pair of laterally spaced-apart keels 22 are rigidly secured to the ends of transverse members 9 by means of angle brackets 23, or other suitable securing means. As seen in FIG. 1, each keel 22 extends vertically just on the outside of plate 7 and side walls 2', substantially below the floor 2" of dinghy 2, serving the same function as the keel of a sail-boat. Each keel 22 is provided with a lateral outwardly-projecting stabilizer fin 45, which is rigidly secured to its keel by means of angle brackets 46. Fins 46 are generally parallel with and located slightly below plate 7, thereby lending extra stability to the craft in agitated waters. Fins 45 can be lined with plastic foam to increase their floatation and, consequently, the floatation of the entire craft.

Preferably, the bow end of plate 7 is provided with a bracket 25 to support a mast 25' to which a sail 25" may be rigged. Sail 25" is preferably rotatably furled around a boom 55 which is pivotally secured to the lower portion of mast 25' and transversely thereto. To raise the sail, a pulley (not shown) is secured to the top of mast 25' and a cable is attached to the top edge of sail 25" and trained on the pulley. The mast and sail are used in association with keels 22 and dinghy 2 to replace the wind-powered propelling system, the cabin 4 and parts 17 to 21 being then removed.

It is to be noted that keels 22 are removably secured. When they are not in use, craft 1 may be rowed and oarlocks 26 are provided for this purpose on each side of plate 7.

Referring finally to FIGS. 7 to 9, there is shown a second embodiment of the base for craft 1, consisting of a flat-bottomed hull 30 having the same general shape as a dinghy. Hull 30 has a depression 31 extending longitudinally and centrally therein and a low floor 32. Preferably, the pontoons of hull 30 are made of lightweight strong plastic foam material 33, which is entirely covered by a hard outer shell 34, which may be of metal or rigid plastic. Preferably, the pontoons of hull 30 are partitioned into separate sections by bulkheads 35. Hull 30 is further provided with fore, aft and two lateral removable plugs 36 concealing holes for a mast, a motor support and two earlocks, respectively.

FIG. 9 shows, in cross-section, the same cabin 4 as in FIG. 4 and having side walls 10, inwardly-extending shoulders 10' and lower sections 10" of side walls 10, which fit in depression 31 and extend close to the inner side walls 37 of hull 30.

As in the first embodiment, cabin 4 is removably supported by transverse members 9, which rest on the pontoons of hull 30. In both embodiments, the craft can be easily converted from a wind-powered craft to a row-boat, since cabin 4 and the wind-powered propelling system can be removed together with transverse members 9 and keels 22 and oarlocks are provided.

The craft can also be converted to a sail-boat by using only transverse members 9 and keels 22, together with the mast 25' with suitable sails and either a rudder mounted on back-rest 15', or with the use of an oar or paddle as a rudder.

If no cabin 4 is required, then the legs 18 can be extended downwardly and removably fixed to transverse members 9, thereby forming the frame-work for supporting the generator 17 and propeller 20.

I claim:

1. A wind-powered water-craft comprising a generally rectangular seaworthy air-inflated dinghy having a generally rectangular longitudinal depression formed by the sides and bottom of said dinghy, said sides defining a peripheral top surface, rigid transverse members extending across said depression and resting on said top surface, a pair of keels secured to the ends of said transverse members and extending downwardly along the sides of said dinghy below said bottom; an electric outboard motor mounted astern of said dinghy; an electric generator for driving said outboard motor, a frame-work secured to said transverse members, upstanding from said dinghy and supporting said generator at the top thereof, a wind-driven propeller axially connected to said generator and adapted to revolve with the wind; said generator being further provided with a horizontal rearwardly-extending vane; and a swivel for said generator, whereby the latter and said propeller can turn towards the direction of the wind; further including two flat, rigid and elongated strips adapted to rest on the top lateral surfaces of said dinghy; a horizontal flat plate adapted to rest both on said strips, being rigidly secured to the latter, and also over the entire said peripheral top surface of the dinghy; said plate being formed with a cut-out portion, generally conforming to the inner dimensions of the dinghy; said rigid transverse members resting on said plate.

2. A wind-powered water-craft as defined in claim 1, wherein said frame-work includes a passenger cabin having a bottom portion located in said depression, said transverse members extending through said cabin and supporting the same.

3. A wind-powered water-craft as defined in claim 2, wherein said frame-work further includes four splayed legs secured to and upstanding from the top of said cabin and joined together to support said generator.

* * * * *